XR 3,357,433
3075E

INVENTORS
MAX FOURESTIER
GERARD FRANCOIS GUIOT
JACQUES FRANCOIS ROUGERIE
HUGUETTE NELLY VULMIERE
JACQUES CLAUDE VULMIERE
BY Albert C. Johnston
ATTORNEY

3357433
OR IN 128/397

INVENTORS
MAX FOURESTIER
GERARD FRANCOIS GUIOT
JACQUES FRANCOIS ROUGERIE
HUGUETTE NELLY VULMIERE
JACQUES CLAUDE VULMIERE

BY Albert C. Johnston
ATTORNEY

INVENTORS
MAX FOURESTIER
GERARD FRANCOIS GUIOT
JACQUES FRANCOIS ROUGERIE
HUGUETTE NELLY VULMIERE
JACQUES CLAUDE VULMIERE
BY Albert C. Johnston
ATTORNEY INVENTORS
MAX FOURESTIER
GERARD FRANCOIS GUIOT
JACQUES FRANCOIS ROUGERIE
HUGUETTE NELLY VULMIERE
JACQUES CLAUDE VULMIERE
BY Albert C. Johnston
ATTORNEY

United States Patent Office 3,357,433

Patented Dec. 12, 1967

3,357,433

ENDOSCOPE FOR ILLUMINATION AND OBSERVATION OF CONTACTING DISTAL REGIONS

Max Fourestier, Vanves, Gérard François Guiot and Jacques François Rougerie, Paris, and Huguette Nelly Vulmiere, born Grangaud, and Jacques Claude Vulmiere, Pre-Saint-Gervais, France, assignors to Etablissement Public Centre National de la Recherche Scientifique, Paris, France, a corporation of France Filed Dec. 3, 1963, Ser. No. 327,623

Claims priority, application France, Dec. 4, 1962, 917,519

6 Claims. (Cl. 128—397)

The present invention relates to contact endoscopes, i.e. to endoscopes adapted to examine an object located in direct or immediate contact of the distal face of the endoscope. An endoscope of this type is utilizable both in therapeutics and in industry.

It is well known that in the case of many endoscopes (investigation of the brain, heart, urethra, etc. or the investigation of the walls of a bore), it is desirable to observe objects in contact with or close to the distal end of the endoscope, whatever the ambient medium (air, water, blood, or any other medium, such as the grey matter of the brain).

For certain of said endoscopies, it was already proposed to use various devices in the shape of transparent rods, adapted to be employed both for lighting and for observation; such devices do not, however, display sufficient luminosity, since the luminous beams which enter the endoscope through the proximal face under a wide incidence contribute but little to the lighting of the organ to be examined, the reflections on the inner wall of the endoscope rod being effected with a low efficiency.

Such endoscopes are therefore unsuitable to offer the physician, the surgeon or the engineer the reliability which they required.

In order to obviate these difficulties, it is a primary object of the present invention to provide an endoscope utilizing a rod susceptible of varying cross-sections and of direct and lateral vision. According to the invention, the endoscope includes a rod having polished generating lines, which is of an optical-quality transparent material and insures a total reflection of any incident light, between the proximal and distal faces—and the dimensions of which are selected as a function of the surface to be examined, the distal end being plane, incurvated or ogival, while the proximal end is plane or convex, said rod being preferably arranged in a protective or prehensile device.

The light-guide rod may be cylindrical, conical or prismatic, the constituent material thereof being either the optical glass, or a synthetic material, silica or the like.

The rod may be advantageously built as a thick lens.

The total reflection is obtained either by coating the rod with a film having a refractive index lower than that of the material of the body of the rod or by using a light-guide according to the invention described in U.S. Patent No. 2,932,294, dated April 12, 1960.

The endoscope according to the invention may be provided, at its proximal part, with "light-collector" means to receive the ambient radiation or the radiation from suitably located light-sources producing, at the input of the endoscope, a light beam the opening angle of which is correlated with the usage for which the endoscope is intended.

According to one embodiment of the invention, the "light-collector" means comprises an extension of the proximal portion of the light-guide body exteriorly to its protection shield, the generating lines of said extension being either bare and dull or striated, or coated with a translucent, opalescent varnish.

According to a further embodiment, the "light-collector" means may be in the shape of a sleeve member fast on the endoscope rod and located in prolongation thereof. Said sleeve member is made of a transparent material, which is apalescent, surface-diffusing, or provided with a set of thread-shaped striations acting as deflection prisms or as total reflection prisms.

When auxiliary light sources are used, these are preferably arranged peripherally around the light-collector, the assembly being suitably housed inside a casing fitted with reflection mirrors or diffusion surfaces.

The proximal face may be plane; it is however preferably of a convex shape such as to assist in giving the rod the preferred shape of a thick lens.

Said proximal portion of the rod of he endoscope may be bevel-edged and carry a prism joined thereto, said prism receiving the radiation from an external source and reflecting it along directions close to the axis of the apparatus, the interface between the prism and the bevel being semi-transparent.

According to still another feature of the invention, the proximal portion of the rod, acting as a "light-guide," may consist of a small-length insertion element the faces of which constitute a lens, thus enabling the spherical aberration and the chromatism of the assembly to be corrected.

According to an alternative embodiment, a magnifying optical view-finder is secured either in the vicinity of the proximal face in such a manner as not to interfere with the laterally or axially incident light onto the input section of the rod, or, preferably, onto the light-collector; these arrangements which substantially improve the observation of the fine details are only possible on account of the high luminosity of the endoscope according to the invention.

Besides, to assist observation, the endoscope may be provided with any suitable means for bending the observation beam on the proximal side (such as prisms, mirrors and the like).

According to yet another feature of the invention, the endoscope comprises means enabling the observer to readily impart to his eye—or to a suitable camera—a correct position with respect to the optical axis of the system. To this end, the endoscope sleeve is suitably provided with an eyepiece and the endoscopic rod is fitted, at its distal portion, with an annular blackened slot or with an annular frosted region, in such a manner that said slot or region, said proximal face of the guide and said eyepiece accurately define the direction and the field of sight.

The distal face of the endoscope according to the invention is plane (thus achieving a perfect surface contact), or ogival, concave, convex, pyramidal, eccentric conical, or else fitted with small-diameter cylindrical portion, in accordance with the use to which the instrument is intended.

In the event of side-vision, a plane and metallized facet surface with a suitable angle is provided opposite a window conveniently provided on the cylindrical portion of the guide and the corresponding portion of the metal casing thereof. For a guide with a cylindrical cross-section, said window is cut along a flat plane if the observation conditions require the suppression of defects introduced by the cylindrical surface.

In order to enable length and angle measurements to be effected, it is possible to cut or engrave on the distal face calibrated marks (such as facets, circles, lines, etc.).

The endoscope according to the invention may be used, depending on the shape imparted to the distal face, as a mandrel-endoscope or as a trocar-endoscope; it may also be equipped with instruments and tools for operating under direct vision, for instance for ablation of tumors, or with electrodes for instance used for electro-coagulation purposes. In this latter case, one of the electrodes, the plate for instance, is brought in direct contact with the patient, The other electrode being formed by the metallic sheath proper of the light-guide. To this end, the latter is electrically insulated by means of a suitable coating (a varnish for instance) over the whole length thereof, except at its distal and proximal portions, over small-size surfaces of suitable shapes.

The endoscope of the invention may also serve to irradiate internal surfaces with ultra-violet or infrared rays, while at the same time the light beams enable one to observe said surfaces.

Various embodiments of the endoscope according to the invention are described in the following description and represented in the drawings in which.

Figure 6A:
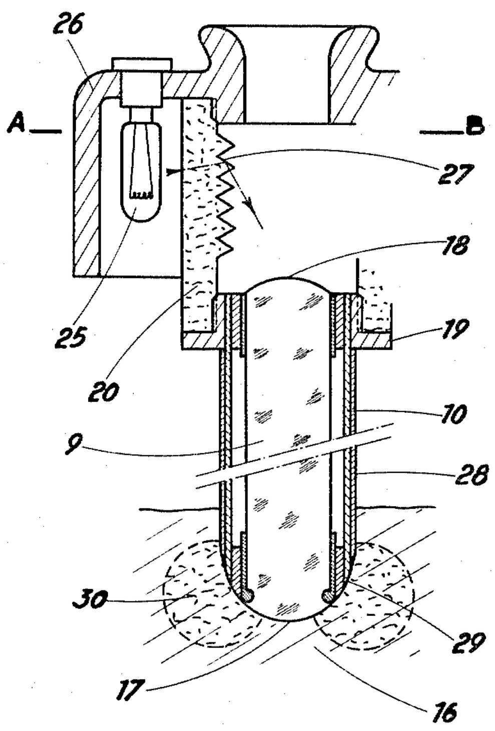
Figure 5:
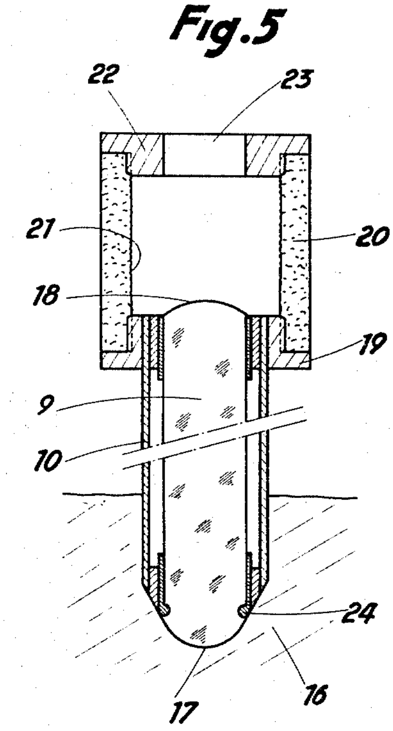
FIG. 5 is an axial, cross-sectional view of an endoscope provided with a sleeve lighted by the ambient radiation and formed with an ocular sight piece.
Figure 6B:
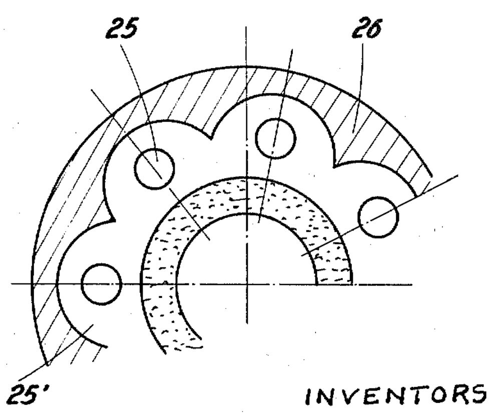

FIG. 6–*a* is a similar view to that of FIG. 5, with the endoscope fitted at its top portion with a striated sleeve member, lighted by sources arranged in a ring relationship.

FIG. 6–*b* is a cross-section along line AB of the lighting sleeve illustrated in FIG. 6–*a*.

Figure 7:
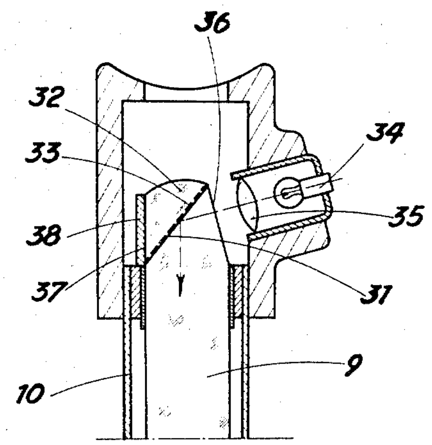

FIG. 7 is a cross-sectional view showing an endoscopic rod with a proximal portion provided with a bevel and with a semi-reflecting prism receiving the radiation from a lateral source.

Figure 8:
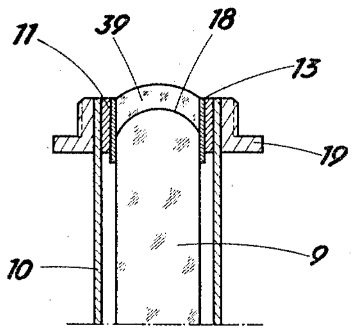
Figure 9:
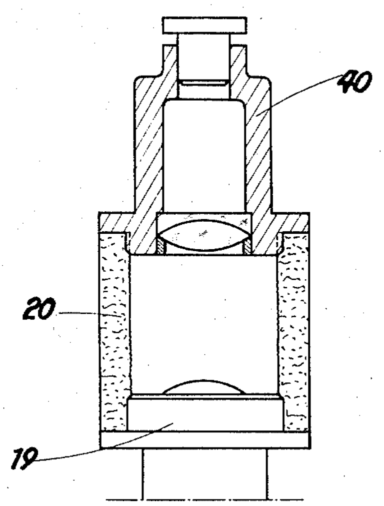
Figure 10:
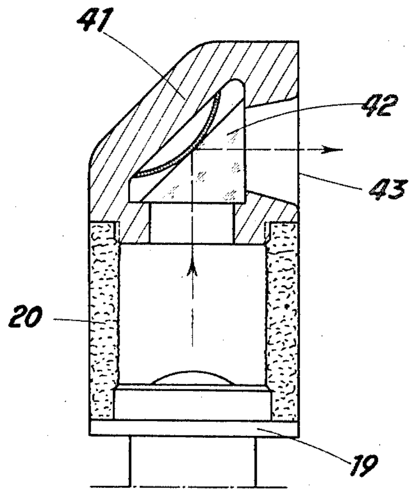

FIGS. 8, 9 and 10 are diagrammatic views of various embodiments of proximal ends of the endoscope according to the invention.

FIGS. 11 through 17 show various possible embodiments of the distal end of the endoscope.

Figure 18A:
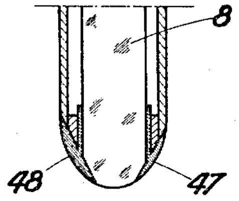
Figure 18B:
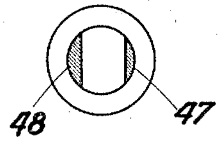

FIGS. 18–*a* and 18–*b* are fragmentary cross-sectional views of the distal end formed with a bevel, to enable measurements to be effected.

Figure 19:
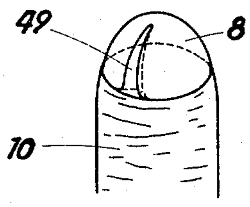
Figure 20:
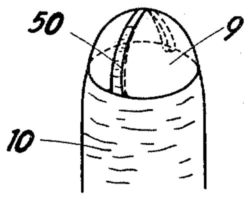

FIGS. 19 and 20 illustrate, diagrammatically, embodiments of the distal end of the endoscope adapted to be used for electro-coagulation.

Figure 1:
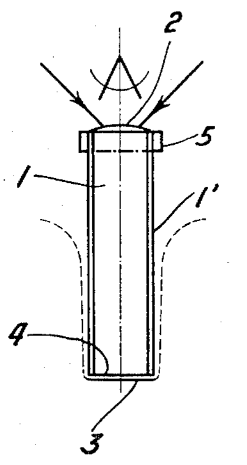
FIG. 1 is a diagrammatic cross-sectional view of a cylindrically-shaped endoscope according to the invention.
Figure 2:
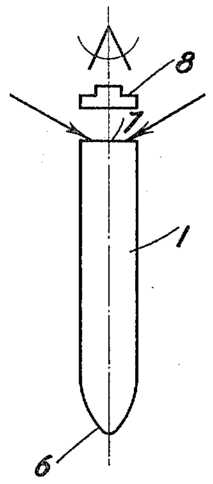
FIG. 2 is a diagrammatic cross-sectional view of an endoscope formed with a distal ogive.

Referring to FIGS. 1 and 2, a cylindrically-shaped rod 1 of optical quality is shown, protected by means of a metallic sheath or casing 1' as disclosed in the patent above referred to. The proximal face 2 of the cylindrical endoscope is spherical and enables the direct axial vision of surface 3 onto which applies the plane distal face 4 of the rod. The lighting is provided by the ambient light and the instrument is held by means of a flanged portion 5.

Figure 3:
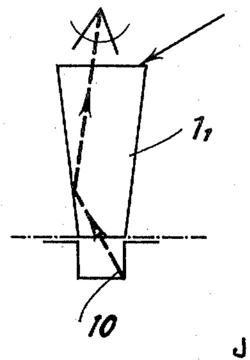
FIG. 3 is a cross-sectional view showing diagrammatically a prismatically shaped endoscope.

The trocar-endoscope shown in FIG. 2 is a cylindrically-shaped rod terminated with an ogive 6; the proximal face 7 is fitted with an ocular sight member 8 and the lighting is provided by the ambient light which may be re-inforced by the scialytic light of the operator which follows up directly and may thus watch the path of the perforation and the condition of the parts traversed. In FIG. 3, the prismatic shape with plane faces $1_1$ imparted to the rod enables one to odserve by reflection on said faces the walls 10 of an opening of which the distal face of a cylindrical rod would allow to see only the bottom.

Figure 4:
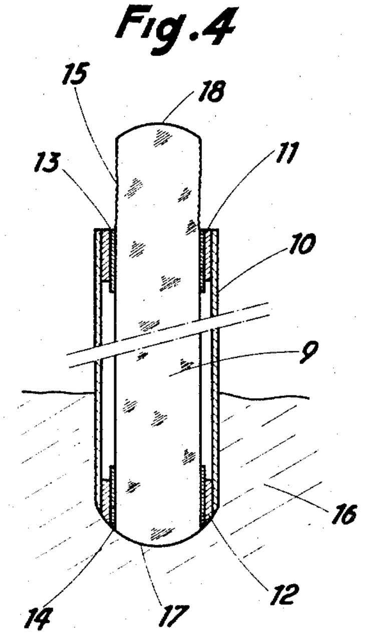
FIG. 4 is a cross-sectional view of an endoscope whose endoscopic rod of optical material projects outside the metallic sheath.

As illustrated in FIGURE 4, the light-guide rod 9 is secured in a sheath or casing 10 by means of rings 11 and 12 covering the silver-platings 13 and 14. The upper portion of the light-guide projects outside the casing and is formed with striations 15. The radiation from all directions incident thereon is caused to be diffused by said striations 15 and enters inside the endoscope to illuminate the medium 16 to be observed. The distal and proximal faces 17 and 18, respectively, are cut in such a manner that the light-guide constitutes a thick lens enabling the region 16 to be observed.

Referring to FIG. 5, the same elements as previously shown in FIG. 4 are represented; in this case, however, the sheath 10 reaches the upper end of the light-guide and is integral with a flange 19 onto which is secured a sleeve 20 of a transparent material; said sleeve is frosted or formed with striations on its inner portion 21 in order for the radiation deriving from the outside from all directions to strike the proximal face 18 of the light-guide. The upper end of the sleeve is provided with a sighting ocular 22 fitted with an opening 23 in its central portion.

According to this embodiment, the guide rod 9 of the endoscope presents, at its distal portion 17, a circular slot 24 filled with an absorbent varnish. This slot, is association with the sight ocular, enables, a correct centering of the eye and assists in locating the observed region.

In the example illustrated in FIG. 6–*a*, which includes certain of the elements shown in FIGS. 4 and 5, the lighting is effected by means of auxiliary sources of light 25 arranged in a casing 26 integral with sleeve 20 screwed onto the flange 19. Sleeve 20, of a transparent material, is formed in this case with striations 27, preferably polished and cut in such a manner as to direct, by reflection or refraction, the radiation derived from the light sources onto the proximal face 18 of the light guide.

For medical applications, the metallic sheath 10 is covered with a suitable insulation 28 over its entire length, except in the region of flange 19 and of the annular distal region 29. This sheath thus serves as an electrode and enables to achieve the coagulation of area 30.

FIG. 6–*b* illustrates an alternative embodiment of casing or sleeve 20 in recesses 25', in which are arranged lamps 25.

This device operates as follows: the rays from lamps 25 reach sleeve 20 and, through the striations 27 thereon, part of the rays reach the endoscope and enter the same along all directions. After having been totally reflected on the walls of the light-guide 9, this radiation leaves through the distal face 17 and lightens the objects of medium 16 in contact with or in the vicinity of this end portion.

Such a device is a little bulkier than those illustrated in FIGS. 4 and 5, but is highly luminous and enables one to take photographs.

In FIG. 7, the proximal end portion of light-guide 9 is provided with a bevelled portion 31 on which is mounted a prism 32 the face 33 of which, in contact with the bevel portion 31, is semi-reflecting. The radiation issued from a light source 34 reaches the surface 33 of prism 32 after having traversed a condenser 35 and a flattening 36 cut on the endoscopic rod 9. To eliminate any parasitic radiation, face 37 of prism 32 is coated with an absorbent varnish 38 of a refractive index equal to that of the prism.

In FIGURE 8, guide 9 carries on its proximal face 18, glued thereon, a lens 39 of a shape and a refractive index selected in such a manner as to correct spherical and chromatic aberrations of the system thus obtained. The lens is then a part of the light-guide and account must be taken thereof when mounting said guide in the sheath 10.

The endoscope illustrated in FIGURE 9 is provided with a flange 19 and a sleeve 20 onto which is secured a magnifying sighting ocular 40.

FIGURE 10 illustrates a means adapted to bend the observation beam. On sleeve 20 is screwed a casing 41 containing a total-reflecting prism 42 directing the beam towards opening 43.

Figure 11:
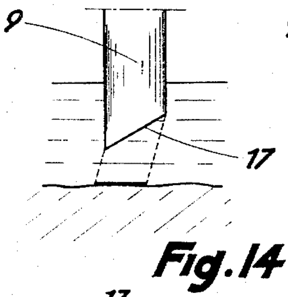

In the alternative embodiment shown in FIGURE 11, the distal face 17 of guide 9 is plane and inclined with respect to the axis of the system, thus enabling the sighting field to be increased by rotation of the endoscope about its axis.

Figure 12:
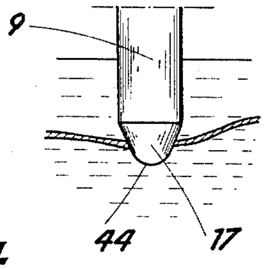

In the example illustrated in FIG. 12, light-guide 9 has a distal end face 17 formed in the shape of a cone with a rounded-off end portion 44. This guide is more particularly adapted to carry out, under direct observation control, perforations of a given diameter.

Figure 13:
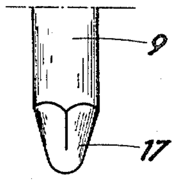

FIG. 13 shows a guide 9 the distal end 17 of which has a pyramidal shape with a rounded-off end portion. This shape has a higher perforating effect than the embodiment described with reference to FIGURE 12.

Figure 14:
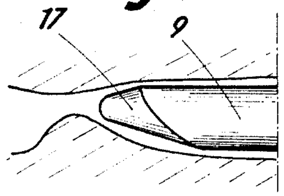

FIGURE 14 illustrates a guide 9 with a distal face 17 in the shape of an eccenter cone to facilitate the insertion thereof into a duct presenting a restricted area, the urethra for instance.

Figure 15:
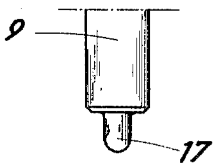

FIGURE 15 shows the case of a trocar-endoscope the distal end 17 of which has been polished and narrowed.

Figure 16:
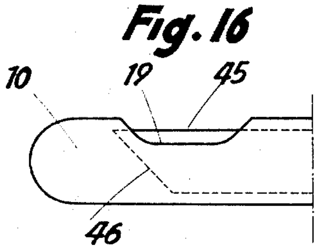
Figure 17:
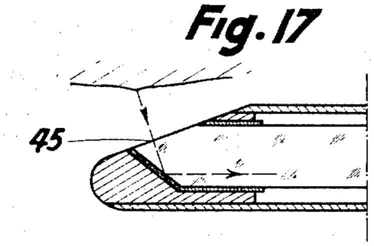

FIGS. 16 and 17 illustrate two possible embodiments of the distal end portion of the endoscope enabling lateral sighting. According to FIGURE 16, the sheath is formed with a window 45 clearing a portion of the end of guide 9 presenting a reflecting facet surface 46. FIGURE 17 is an alternative arrangement of the device in FIGURE 16, wherein said window 45 is plane.

FIGURE 18–*a* is a cross-sectional view of the distal end provided with blackened bevels 47 and 48, having predetermined dimensions and spacings, to perform measurements in the contact regions.

FIGURE 18–*b* shows the aspect as observed through the endoscope of FIGURE 18*a*.

FIGS. 19 and 20 are perspective views of two embodiments of the distal end of an endoscope used for electrocoagulation purposes. The sheath 10 forming the electrode has an extension shaped as a thumb 49 (FIG. 19) or as a handle or ear 50 (FIG. 20), the thumb or ear members being inserted in slots provided for this purpose on the end portion of the light-guide.

In all previously described examples, which were given only by way of a non limitative indication, the light-guide was mounted according to the method as described in the above-mentioned Patent No. 2,932,294, as said method was found, in practice, to give the best results, but it is obvious that satisfactory total reflections may be obtained on the side faces of the light guide by making use of a central guide of a transparent material coated with a substance having a lower refractive index.

In addition to its simplicity of construction, its brightness and its low cost, the contact endoscope according to the present invention has the advantage of extremely small dimensions, both as to the length and as to the diameter thereof (in fact, the diameter may be smaller than the millimeter), so that the device allows observations of very small surfaces to be carried out in direct light, by using openings having a diameter equal to that of the light-guide, thus facilitating the work in the skull or on fistulae, etc., as well as the examination of the organs of small-size animals (rectum of frogs, etc.) or of industrial cavities normally inaccessible to the eye and to the tool.

What we claim is:

1. A contact endoscope for illuminating and observing structure at the distal end thereof by means of light incident to the proximal end thereof, comprising a metallic sheath, a rod coaxial and substantially co-extensive with said sheath and having a proximal end face and a distal end face at opposite ends of said sheath, means for interlocking said sheath and said rod, said rod being of optical-quality transparent material and having polished generating lines and providing a total reflection of the incident light between said proximal and distal faces, said proximal end face being convex and disposed outside said sheath, means including a cylindrical sleeve secured to and extending beyond the proximal end of said rod in coaxial relation thereto, said sleeve comprising a transparent body having on its inner side inclined surfaces for directing to said proximal end face light emanating from outside said body, mounting means at one end of the sleeve mounting the sleeve on the sheath adjacent the proximal end of the rod, and cap means at the other end of said sleeve, said cap means including a sighting aperture directed through said sleeve for viewing said proximal end face in a direction coaxial with said rod.

2. A contact endoscope according to claim 1, said rod having on its distal end and beyond said sheath a cylindrical end portion of smaller diameter than the body of said rod, the axis of said end portion being parallel to the axis of said rod and the end portion defining a rounded outward terminal portion.

3. A contact endoscope according to claim 1, further comprising spaced light-absorbent coverings attached to the distal portion of said rod, said coverings being symmetrical with respect to the axis of said rod for axially orienting the rod relative to the structure under observation at said distal end.

4. A contact endoscope according to claim 3, said light-absorbent means comprising blackened regions on said distal portion of said rod.

5. A contact endoscope according to claim 3, said light-absorbent coverings comprising frosted regions on said distal portion of said rod.

6. A contact endoscope for illuminating and observing structure at the distal end thereof by means of light incident to the proximal end thereof, comprising a metallic sheath, a rod coaxial with said sheath and having a proximal end face and a distal end face, means for interlocking said sheath and said rod, said rod being of optical-quality transparent material and having polished generating lines and providing a total reflection of the incident light between said proximal and distal faces, means including a sleeve secured to and extending beyond the proximal end of said rod in coaxial relation thereto for collecting light and directing it to said proximal end face, and means including a sighting aperture directed through said sleeve for viewing said proximal end face in a direction coaxial with said rod, said sheath being electrically conductive and having an insulating covering thereon, said distal end of said rod protruding from said sheath and said distal end having a groove in at least a portion of the distal end face, and an extension of said sheath located in said groove.

References Cited

UNITED STATES PATENTS

| | | | |
|---|---|---|---|
| 2,031,020 | 2/1936 | Wappler | 128—303.17 |
| 2,394,949 | 2/1946 | Straat | 88—14 |
| 2,843,112 | 7/1958 | Miller | 128—6 |
| 2,932,294 | 4/1960 | Fourestier et al. | 128—6 |
| 3,060,806 | 10/1962 | Lewis et al. | 88—1 |
| 3,090,379 | 5/1963 | Ferris et al. | 88—1 X |
| 3,157,089 | 11/1964 | Menefee | 88—14 X |
| 3,187,627 | 6/1965 | Kapany | 88—1 X |

JEWELL H. PEDERSEN, *Primary Examiner.*

B. LACOMIS, *Assistant Examiner.*